United States Patent
Aramaki et al.

[11] Patent Number: 5,193,282
[45] Date of Patent: Mar. 16, 1993

[54] ROTATING BODY TRACING CONTROL APPARATUS

[75] Inventors: Hitoshi Aramaki; Tetsuji Okamoto, both of Minamitsuru, Japan

[73] Assignee: Fanuc Ltd., Minamitsuru, Japan

[21] Appl. No.: 741,487

[22] PCT Filed: Dec. 7, 1990

[86] PCT No.: PCT/JP90/01604
§ 371 Date: Aug. 7, 1991
§ 102(e) Date: Aug. 7, 1991

[87] PCT Pub. No.: WO91/08862
PCT Pub. Date: Jun. 27, 1991

[30] Foreign Application Priority Data
Dec. 11, 1989 [JP] Japan .................. 1-320915

[51] Int. Cl.$^5$ ............ B43L 13/24; B23Q 35/04; G05B 19/35
[52] U.S. Cl. .................. 33/23.01; 33/23.02; 33/23.08; 318/578; 364/474.03; 409/99
[58] Field of Search ........... 33/23.01, 23.02, 23.04, 33/23.08, 21.1, 22, 41.5; 364/474.03, 474.32; 318/578; 409/99, 98

[56] References Cited
U.S. PATENT DOCUMENTS

| | | | |
|---|---|---|---|
| 2,429,559 | 10/1947 | Matson | 33/23.08 |
| 3,100,344 | 8/1963 | Sharp | 33/23.01 |
| 3,888,162 | 6/1975 | Maenner | 33/23.01 |
| 4,370,722 | 1/1983 | Imazeki et al. | 364/474.03 |
| 4,534,685 | 8/1985 | Komiya et al. | 409/99 |
| 4,575,665 | 3/1986 | Matsuura et al. | 318/578 |
| 4,870,337 | 9/1989 | Matsuura | 318/578 |
| 4,982,336 | 1/1991 | Aramaki | 364/474.03 |
| 5,015,130 | 5/1991 | Matsuura et al. | 318/578 |
| 5,058,281 | 10/1991 | Leviton | 33/23.02 |

FOREIGN PATENT DOCUMENTS
762966 12/1956 United Kingdom .......... 33/23.08

Primary Examiner—William A. Cuchlinski, Jr.
Assistant Examiner—C. W. Fulton
Attorney, Agent, or Firm—Staas & Halsey

[57] ABSTRACT

A rotating body tracing control apparatus which performs a tracing while rotating a model and a workpiece. A plurality of point coordinates (P1 or P10) are set on the outer peripheral surface of the model (6), which points depend on a position of the central axis of the rotation and the angle of the rotating axis of the rotation, and a tracing is executed by using a line connecting the individual points (P1 to P5, P6 to P10) as a potential line. Therefore, even when tracing a model, such as a groove of a cylindrical cam having a shape which varies along the central axis of a rotating body, only the groove region can be set around the potential line, and thus the tracing time can be shortened and the groove alone can be treated with a high accuracy.

7 Claims, 3 Drawing Sheets

ROTATING BODY TRACING CONTROL APPARATUS

BACKGROUND OF THE INVENTION

1. Field of the Invention

The present invention relates to a rotating body tracing control apparatus which performs a tracing operation while rotating a model and a workpiece, and more particularly, to a rotating body tracing control apparatus in which a method of setting a potential line for defining a tracing range is improved.

2. Description of the Related Art

A rotating body tracing control apparatus is used when machining, for example, a cylindrical cam, and in such a rotating body tracing control apparatus, a model and a workpiece are rotated at the same angular speed as the speed at which the surface of the model is traced by a tracer head, and the feeding speed with respect to the Z-axis direction is obtained in accordance with a detection signal, whereby the movement of the tracer head and a cutter head is controlled.

FIG. 3 is a diagram showing the relationship between a stylus and a cylindrical cam model which is traced by using the rotating body tracing control apparatus.

In FIG. 3 the stylus 5 at the distal end of the tracer head, which is movable in the Z-axis direction, detects the distance between the central axis of rotation (X-axis) of the model 6 and the point of contact of the stylus 5 with the model, by determining the displacement of the stylus 5. The tracing direction of the tracer head corresponds to the X-axis direction, and a pick feed direction to an A-axis direction.

Software limit switches, such as indicated by broken lines LXN and LXP, can be set by assigning points XN and XP on a line extending in the tracing direction (X-axis direction), and a tracing region is decided by using these software limit switches.

Accordingly, the tracer head executes a tracing with respect to the X-axis direction, and the movement thereof is stopped in the X-axis direction when the contact point of the stylus 5 comes into contact with the software limit switches LXN and LXP. Thereafter, pick feed is effected in the A-axis direction, and the X-axis is traced in the opposite direction. These operation processes are repeatedly executed.

When tracing the model 6, such as a cylindrical cam, having a groove which is curved along the X-axis direction, the tracer head is expected only to trace the groove portion of the cylindrical cam, and does not trace the outer peripheral surface of the model 6, such as regions F1 and F2.

Conventionally, however, one point on the central axis (X-axis in FIG. 3) of rotation is assigned to set the software limit switches, so that the software limit switches must be inevitably set by assigning the points XN and XP even when tracing the cylindrical cam model 6. Therefore, when tracing a cylindrical cam like the model 6, the tracer head traces the whole region of the peripheral surface of the cylinder, including the points XN and XP, and thus, conventionally, the region to be traced is so extensive that the tracing work requires much time.

SUMMARY OF THE INVENTION

The present invention has been contrived in consideration of these circumstances, and an object thereof is to provide a rotating body tracing control apparatus capable of tracing any desired region of a model, such as a groove of a cylindrical cam, having a shape which varies along the central axis of a rotating body.

To solve the above problem, according to the present invention, there is provided a rotating body tracing control apparatus which performs a tracing operation while rotating a model and a workpiece, in which the rotating body tracing control apparatus is characterized by setting a plurality of point coordinates on the outer peripheral surface of the model, which points depend on a position on the central axis of the rotation and angle of the rotating axis of the rotation, and executing the tracing by using a line connecting the plurality of points as a potential line.

The point coordinates on the outer peripheral surface of the model are assigned in accordance with the position of the central axis of the rotation and the angle of the rotating axis of the rotation. Namely, a plurality of such point coordinates are set on the outer peripheral surface of the model, and the line connecting these points is used as the potential line. Accordingly, any desired region on the outer peripheral surface of the model can be traced as a region to be worked, and thus, even when tracing a model such as a groove of a cylindrical cam having a shape which varies along the central axis of a rotating body, only the groove region can be set around the potential line, and therefore, the tracing time can be shortened and the groove alone can be traced with a high accuracy.

DESCRIPTION OF THE PREFERRED EMBODIMENT

One embodiment of the present invention will now be described with reference to the drawings.

Figure 1:
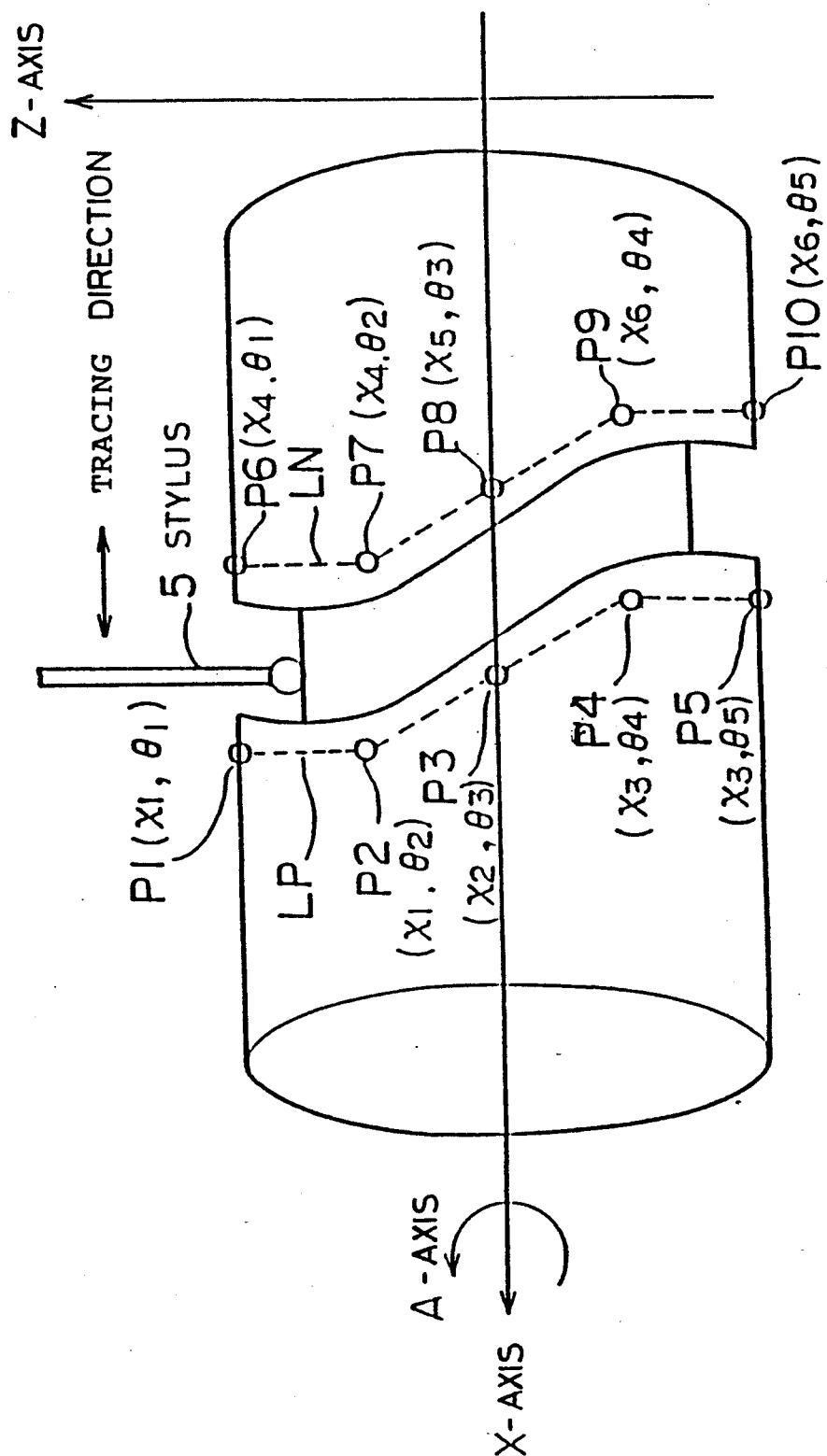
FIG. 1 is a diagram showing the relationship between a stylus and a cylindrical cam model which is traced by using a rotating body tracing control apparatus according to the present invention.
Figure 3:
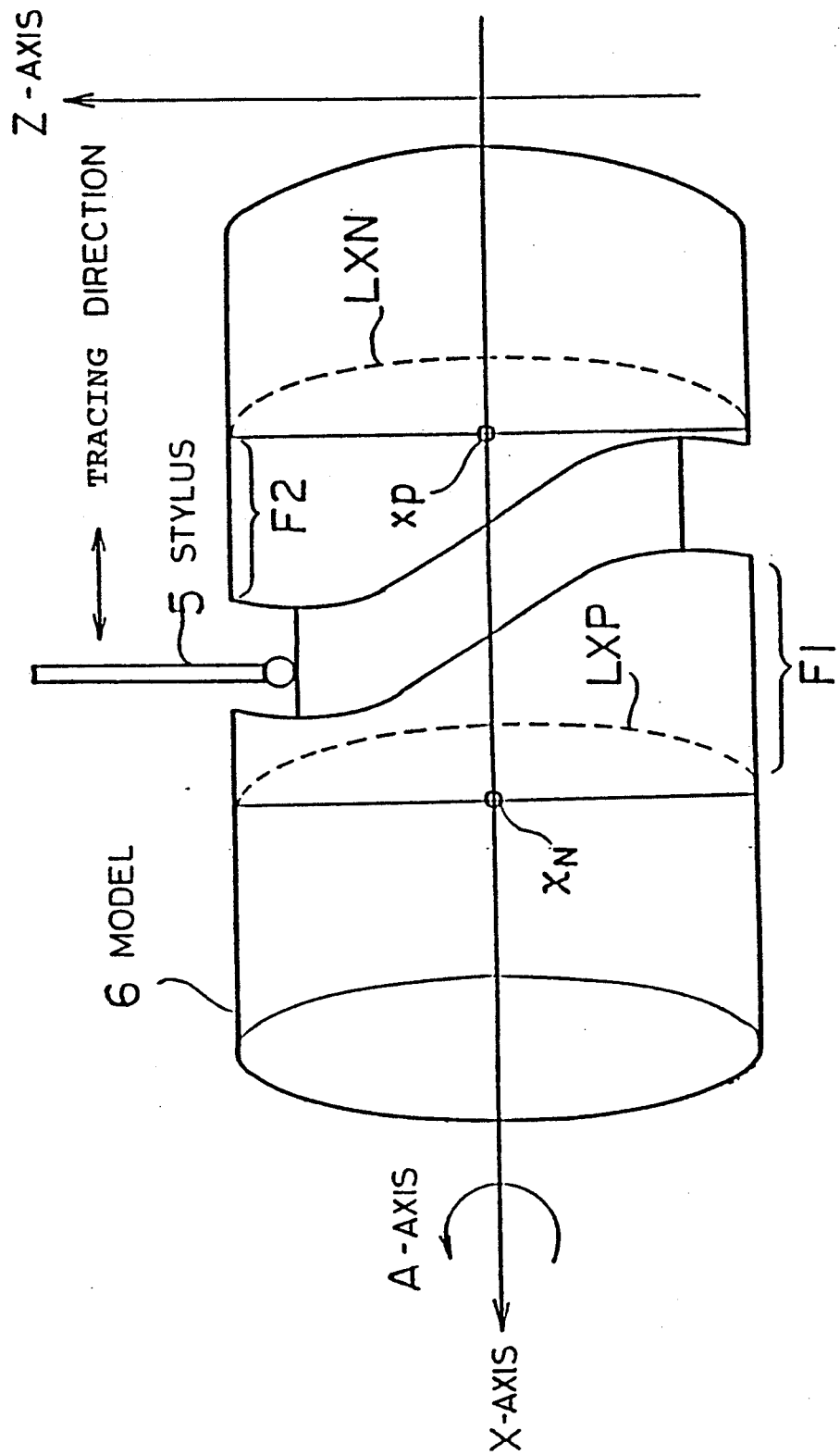
FIG. 3 is a diagram showing the relationship between a stylus and a cylindrical cam model which is traced by using a rotating body tracing control apparatus.

FIG. 1 is a diagram showing the relationship between a stylus and a cylindrical cam model which is traced by a rotating body tracing control apparatus according to the present invention. In FIG. 1, like reference numerals are used to denote the same components as those shown in FIG. 3, and thus a description of those components is omitted.

In the present invention, a potential line can be assigned on the basis of coordinates $(x, \theta)$ which depend on the coordinate x of a position on the central axis X of a rotating body and the angle $\theta$ of the rotating axis thereof, in addition to the conventional software limit switches. More specifically, in FIG. 1, point coordinates $(x1, \theta 1)$ indicates a point P1 on the outer peripheral surface of a model 6, the X-axis position of which is on a point x1 and the A-axis position of which is at an angle $\theta 1$. Similarly, points P2, P3, P4 . . . are represented by their respective coordinates.

Thus, if the points P1 and P2 are assigned, then a potential line is set on a line which connects the points P1 and P2 on the outer peripheral surface of the model 6, and if these points are assigned in the order of points P1, P2, P3, P4 and P5 along a groove on the cylindrical cam, a positive potential line LP is set on a line which connects these points on the outer peripheral surface of the model 6. In the same way, a negative potential line LN is set on a line which connects points P6, P7, P8, P9 and P10. Thus, the tracer head profiles only the groove of the cylindrical cam in accordance with these potential lines.

Namely, the control apparatus monitors the positive potential line LP while the stylus 5 is tracing the X-axis in the positive direction, and when the stylus 5 goes beyond the positive potential line LP, a pick feed in the A-axis direction is effected at this point. Thereafter, when the stylus 5 goes beyond the negative potential line LN while tracing the X-axis in the opposite or negative direction, a pick feed in the A-axis direction is effected.

According to the present embodiment, since only the groove of the cylindrical cam can be traced, the time required for the tracing can be considerably shortened.

Figure 2:
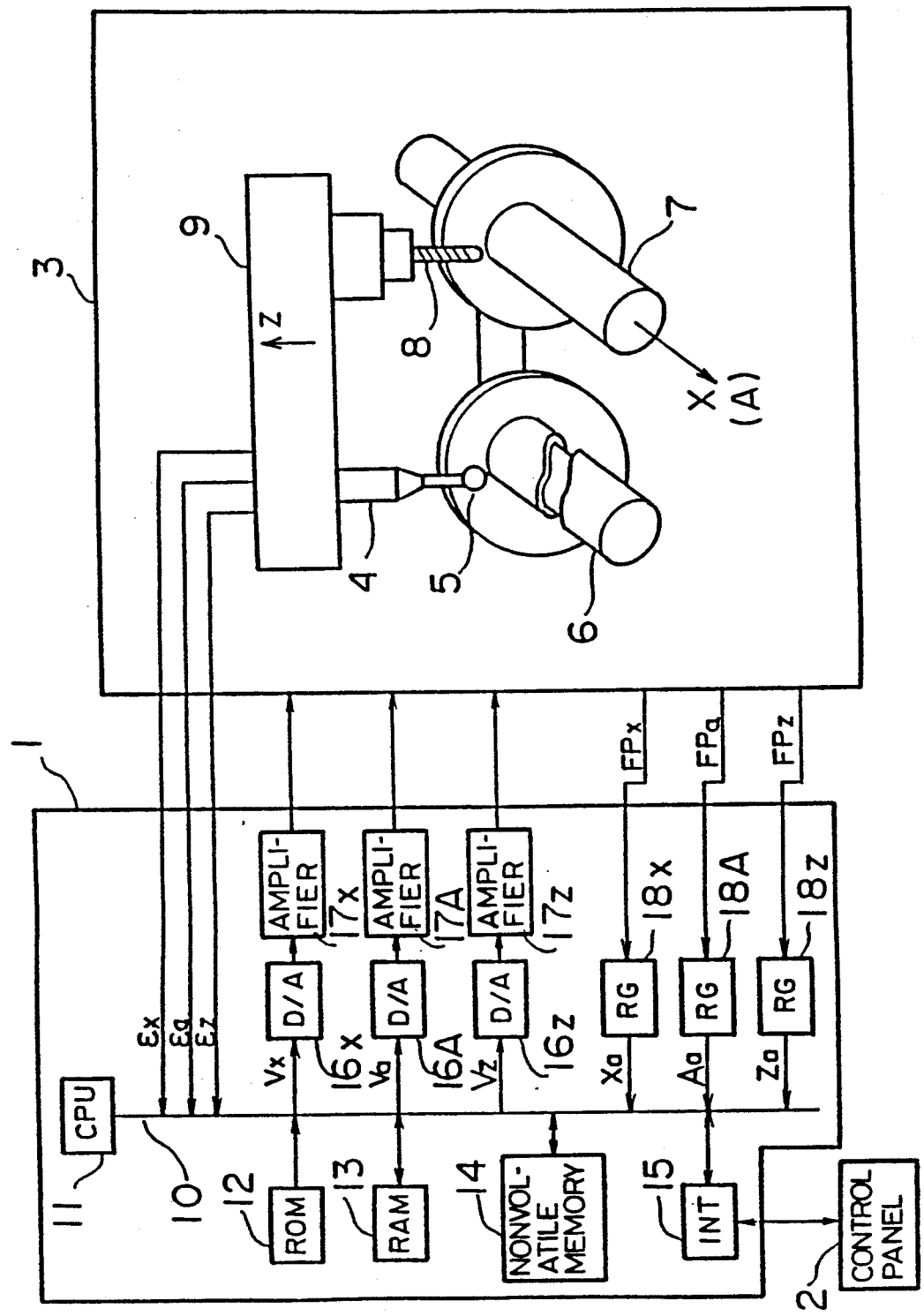
FIG. 2 is a block diagram showing an arrangement of a rotating body tracing control apparatus according to one embodiment of the present invention.

FIG. 2 is a block diagram showing an arrangement of the rotating body tracing control apparatus according to one embodiment of the present invention.

In FIG. 2, a processor (CPU) 11 controls the general operation of the rotating body tracing control apparatus 1. A ROM 12 is loaded with a system program, and a RAM 13 temporarily stores various data. Namely, the processor 11 reads out the system program in the ROM 12 through a bus 10, and accordingly, temporarily stores the data in the RAM 13.

A nonvolatile memory 14, which is backed up by a battery (not shown), stores various parameters, such as the tracing direction and speed, input from a control panel 2 through an interface 15.

The tracer head 4, which is provided in a tracing machine 3, detects displacements $\epsilon x$, $\epsilon a$ and $\epsilon z$ of the stylus 5 at the distal end thereof in the X-, A-, and Z-axis directions, respectively, caused by the stylus 5 touching the model 6, converts the displacements into digital values, and inputs those values to the processor 11.

Based on the displacements $\epsilon x$, $\epsilon a$ and $\epsilon z$ and the instructed tracing direction and speed, the processor 11 generates an X-axis speed command Vx, A-axis speed command Va, and Z-axis speed command Vz using the conventional technique. These speed commands are then converted into analog values by D/A converters 16X, 16A and 16Z, and individually supplied to servo amplifiers 17X, 17A and 17Z. Accordingly, the servomotors (not shown) for moving various axes of the tracing machine 3 are driven by the respective outputs of the servo amplifiers 17X, 17A and 17Z, whereby thus, the positional relationship between the tracer head 4 and the model 6 is kept fixed. When the tracer head 4 moves in the Z-axis direction, a table 9 also moves in the Z-axis direction, and thus a cutter head 8 works a workpiece 7 into the same shape as the model 6.

The servomotors for controlling the individual axes are each provided with pulse coders (not shown) which generate detection pulses FPx, FPa and FPz each time the servomotors are rotated by a predetermined amount. Current position registers 18X, 18A and 18Z in the tracing control apparatus 1 count up or down the detection pulses FPx, FPa and FPz, respectively, depending on the rotating directions, and output current position data Xa, Aa and Za for the tracer head 4. This current position data Xa, Aa and Za is read by the processor 11, and then subjected to a predetermined processing.

Although the tracing direction of the tracer head has been described as corresponding to the X-axis direction according to the above embodiment, alternatively the tracing direction may be aligned with the A-axis direction. In this case, the stylus 5 may be designed so as to calculate a line parallel to a potential line, on a zigzag line which connects a plurality of points, so that a one-path tracing can be executed along the parallel line. Accordingly, the stylus traces a line along the groove, and thus the groove can be smoothly cut in accordance with the shape of the model.

According to the present invention, as described above, any desired potential line can be set on the circumference of a rotating body, so that any desired region can be traced, even when tracing a rotating body, and thus the machining time can be shortened and the machining accuracy improved.

What is claimed is:

1. A rotating body tracing control apparatus, comprising:
    tracing means for tracing and machining a groove shape of a model and a workpiece while rotating the model and the workpiece, respectively; and
    tracing control means for controlling said tracing means, including—
        storage means for storing a plurality of point coordinates of an outer peripheral surface outside of the groove shape of the model, the point coordinates of each point representing a position along a central axis of rotation and an angle about the central axis of rotation, and
        means for executing tracing bounded by at least one line connecting the plurality of point coordinates.

2. A rotating body tracing control apparatus according to claim 1, wherein movement along the central axis and movement around the central axis correspond to a tracing direction and a pick feed direction, respectively.

3. A rotating body tracing control apparatus according to claim 1, wherein movement around and along the central axis correspond to a tracing direction and a pick feed direction, respectively, and one path is traced parallel to the at least one line connecting the point coordinates.

4. A method of performing tracer controlled machining of a workpiece rotating in synchronism with a model having a surface, the workpiece and model each having a central axis of rotation, said method comprising the steps of:
    (a) storing coordinates of a plurality of points on the surface of the model;
    (b) defining at least one potential line formed of non-collinear line segments each connecting an adjacent pair of the points in dependence upon the coordinates stored in step (a); and
    (c) machining a groove into the workpiece in dependence upon tracing of the model bounded by the at least one potential line.

5. A method as recited in claim 4, wherein said storing in step (a) stores first and second coordinates for each of the points, the first coordinate representing a position along the central axis and the second coordinate representing an angle of rotation about the central axis, with respect to a reference point on the surface of the model.

6. A method as recited in claim 4, wherein said machining in step (c) comprises:

(c1) machining the groove during movement of a tool in a first direction parallel to the central axis;

(c2) performing a pick feed by rotating the model and the workpiece around the central axis; and (c3) machining the groove in a second direction, opposite to the first direction and parallel to the central axis.

7. A method according to claim 4, wherein said machining in step (c) comprises the steps of:

(c1) machining the groove into the workpiece while rotating the model and the workpiece in synchronism about the central axis of rotation of each; and (c2) performing a pick feed in a direction parallel to the central axis of each.

* * * * *